Jan. 23, 1951  Q. WALD  2,539,357
WING-TIP CONTROL SURFACE FOR TAILLESS AIRPLANES
Filed Nov. 20, 1945
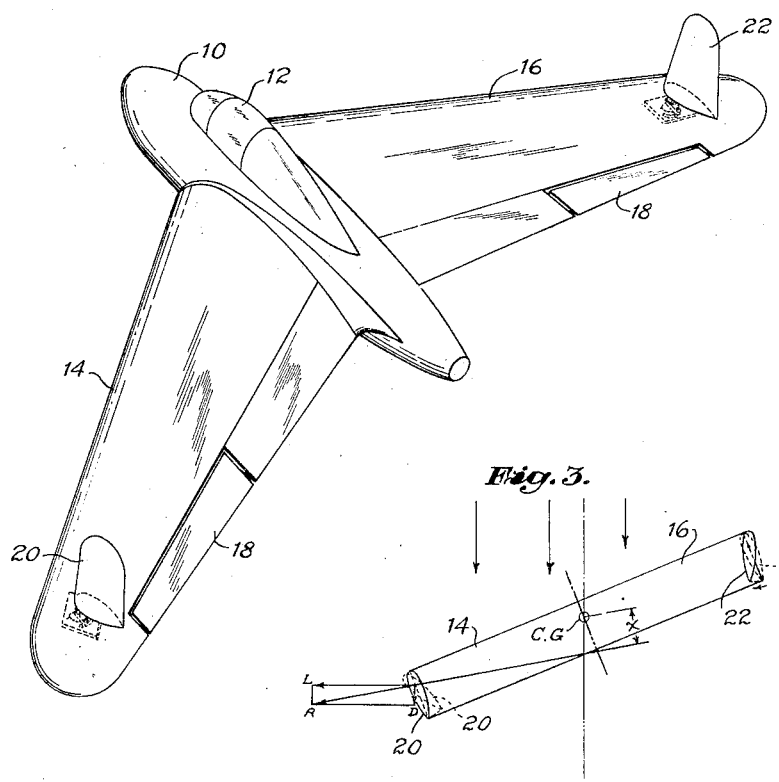
Fig. 1.
Fig. 3.
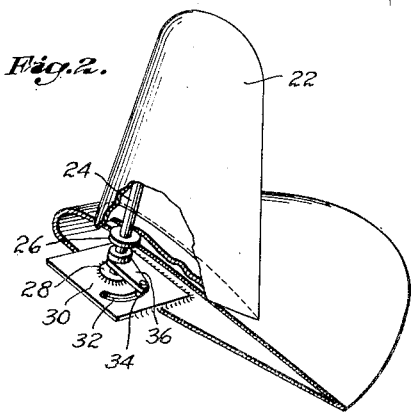
Fig. 2.
INVENTOR
Quentin Wald
BY M. B. Tasker
Attorney Patented Jan. 23, 1951

2,539,357

UNITED STATES PATENT OFFICE 2,539,357

WING-TIP CONTROL SURFACE FOR TAILLESS AIRPLANES

Quentin Wald, Woodmont, Conn., assignor to United Aircraft Corporation, East Hartford, Conn., a corporation of Delaware Application November 20, 1945, Serial No. 629,885

6 Claims. (Cl. 244—87)

This invention relates to improvements in tailless airplanes, and has as one of its objects the provision of improved means for obtaining inherent directional stability in airplanes of this type.

More specifically, it is an object of the invention to provide means operative upon a deflection of the airplane in yaw to set up forces exerted in a direction producing a restoring moment about the center of gravity of the airplane which will return the airplane to its original direction of flight with respect to the relative wind.

A further object of the invention is generally to improve the directional stability of tailless airplanes.

These and other objects and advantages of the invention will become apparent from the following detailed description and the appended claims when considered in connection with the accompanying drawings which illustrate one practical embodiment of the invention.

In these drawings,

Fig. 1 is a perspective view of a tailless airplane embodying the invention;

Fig. 2 is an enlarged detail of a wing tip of the airplane of Fig. 1; and

Fig. 3 is a diagrammatic view of a wing embodying the invention and illustrating the forces acting to restore the wing to its normal direction of flight following a yawing movement.

The invention is of particular value in tailless airplanes although it is not limited to use in such airplanes. As herein shown, the invention is embodied in a tailless, jet propelled airplane comprising a fuselage 10 having a pilot compartment 12 and sharply swept back wings 14 and 16 provided with the usual trailing edge ailerons 18.

In accordance with the present invention, vertical fins, or vanes, 20 and 22 of airfoil cross-section are pivotally mounted on the upper surface of the wings 14 and 16 respectively adjacent the wing tips thereof. These fins, as shown more clearly in Fig. 2, are pivoted for free floating movement about vertical axes located slightly forward of their aerodynamic centers and are of substantially symmetrical airfoil shape so that virtually no induced drag other than possibly skin friction will be present when the fins are aligned with the relative wind. To this end, each of the fins carries a vertical shaft 24 to which it is rigidly secured and which is mounted in bearings 26 and 28 carried by the upper and lower wing surfaces internally of the wing, these bearings in the construction illustrated being welded to the inner wing surfaces.

Considering specifically the right hand fin 22, the lower bearing 28 is provided with a flange 30 which is welded at its periphery to the lower wing surface and is provided aft of the bearing 28 with an arcuate slot 32 struck about the axis of pivotation of the fin and adapted to receive a depending pin 34 on an arm 36 which is rigidly secured to the rod 24 and swings with the fin as the latter pivots in its bearings.

The length of the slot 32 and its location relative to the pivot rod 24 is such as to permit the fin to occupy a position in which its chord line is substantially parallel with the longitudinal center line of the airplane when the pin 34 is in the right hand end of the slot as shown in Fig. 2; and the slot extends inwardly toward the center line of the airplane so as to permit the fin to move through a considerable angular distance before it is arrested by engagement of pin 34 with the inner end of the slot. In Fig. 2 the right hand fin 22 has been shown in detail but it will be understood that the fin 20 on the left hand wing 14 is similarly mounted for movement between a position in which its chord line is parallel with the longitudinal center line of the airplane, in which its pin 34 is engaged with the outboard end of its cooperating slot 32, and an inwardly deflected position similar to that permitted fin 22 in Fig. 2.

The operation of the fins 20 and 22 will be best understood from references to Fig. 3 where wings 14 and 16 are shown diagrammatically with the fins 20 and 22 in the positions assumed by these fins following a deflection of the airplane to the left in yaw. It will be noted that while the airplane has yawed to the left, the right hand fin 22 has remained in alignment with the oncoming airstream, as permitted by the slot 32 in which its pin 34 can freely move inboard. The left hand fin 20, however, has moved bodily with the airplane into a position in which its chord line lies at an acute angle to the direction of flight, since its pin 34 is in the outboard end of its cooperating slot 32.

In this position of the parts, it will be evident that the oncoming airstream flowing past the streamlined fin 22 produces no appreciable effect on the airplane; but due to the angle of attack of fin 20 produces lift and drag forces on the latter as indicated by the vectors in Fig. 3. The resultant force acts on the airplane through a moment arm $x$ measured from the center of gravity of the wing which produces a restoring movement about the center of gravity tending to return the airplane to its original position in which it is symmetrical with the direction of flight.

It will be obvious that a similar deflection of the airplane to the right in yaw will result in a counterclockwise movement of the fin 20 relative to the wing 14 into the dotted position shown in Fig. 3 in which it is longitudinally aligned with the airstream while the fin 22, being unable to move in a counterclockwise direction due to the fact that its stop pin 34 is already in the right hand end of the slot 32, will remain in its normal position relative to the wing so that a restoring moment about the center of gravity of the airplane is set up tending to move the airplane counterclockwise about its center of gravity until its fore and aft center line is again aligned with the direction of flight.

As a practical matter the slots 32 for the stop pins 34 are designed so that when the pins 34 engage the outboard ends of the slots in normal forward flight the fins 20 and 22 are very slightly inwardly directed so that the normal forces acting on these fins as the airplane moves in directionally stable flight hold the pins firmly against the outboard ends of the slots.

While I have illustrated the invention in connection with a tailless airplane it will be evident that the principles involved are applicable to airplanes of other types, for example, all wing, low aspect ratio airplanes, and that various changes may be made in the construction and arrangement of the parts without departing from the scope of the invention as defined in the appended claims.

What it is desired to secure by Letters Patent is:

1. In an airplane having wing surfaces on opposite sides of a central longitudinal plane, vertical fins pivotally mounted on said surfaces and movable about axes located on, or to the rear of, a transverse line through the center of gravity of the airplane and upstanding from said surfaces, said fins having a substantially symmetrical airfoil cross section and being pivoted forward of their aerodynamic center for free floating movement in the stream of air passing over said surfaces, and stop means for each fin limiting the outboard movement of the trailing portion thereof beyond a position in which the longitudinal center line of the fin is substantially parallel with said plane while permitting free inboard movement of said trailing portion relative to said wing.

2. In a tailless airplane having wing surfaces on opposite sides of a longitudinal center line, vertical fins of substantially symmetrical airfoil cross section pivotally mounted adjacent the tips of said wing surfaces for limited movement about vertical axes located on, or to the rear of, a transverse line through the center of gravity of the airplane, said fins normally floating about their axes in the airstream passing over said surfaces and lying parallel with the direction of flight of the airplane, and cooperating stop means for each fin, one of which is movable with the fin and the other of which is carried by the adjacent wing surface for arresting the outboard movement of the trailing edges of said fins in positions in which they are substantially parallel with said center line, while permitting them to swing freely inboard of these positions.

3. In a tailless airplane having wing surfaces on opposite sides of a longitudinal center line, vertical fins of symmetrical airfoil cross section substantially perpendicular to said upper wing surfaces and lying substantially parallel with said center line in normal forward flight of the airplane, said fins being mounted for free floating movement about vertical axes located on, or to the rear of, a transverse line through the center of gravity of the airplane and which lie near their aerodynamic center for permitting the fin on the forwardly moving wing surface in a yawing movement of the airplane to swing inwardly about its pivot relative to the airplane and remain parallel with the airstream passing over said surface, and stop means for holding the trailing edge of the fin on the aft moving wing surface against outboard movement about the fin axis beyond a position parallel to the longitudinal axis of the airplane for creating a restoring moment about the center of gravity of the airplane tending to return the airplane to a symmetrical position relative to its direction of flight.

4. The combination in an airplane having wing surfaces extending on opposite sides of a fore-and-aft centerline, of means for imparting inherent directional stability to the airplane in yaw including fins mounted forward of their aerodynamic center for free floating movement about axes upstanding from said wing surfaces, said axes being located on, or to the rear of, a transverse line through the center of gravity of the airplane, and means for positively arresting the outboard movement of a fin the trailing portion of which tends to move outboard upon a deflection of the airplane in yaw to produce a restoring moment about the center of gravity of the airplane due to the aerodynamic lift forces acting on said fin and return the airplane to its normal flight position, said arresting means limiting said fin against outboard movement beyond a position parallel to the longitudinal axis of the airplane.

5. In an airplane having wing surfaces on opposite sides of a central longitudinal plane, improved means for imparting inherent directional stability to the airplane in yaw, the improvement comprising, vertical fins pivotally mounted at points spaced from said plane for free floating movement about axes located on, or to the rear of, a transverse line through the center of gravity of the airplane and substantially normal to said surfaces, said fins being of substantially symmetrical airfoil shape, and means cooperating with said fins in yawed flight whereby the latter produce aerodynamic lift forces which act about the center of gravity to return the airplane to normal flight position, including stops for limiting the outboard movement of the trailing portions of said fins beyond positions in which said fins lie substantially parallel with said plane.

6. In combination with an airplane having wing surfaces extending on opposite sides of a fore and aft centerline, of means for imparting inherent directional stability to the airplane in yaw including fins mounted forward of their aerodynamic center for free floating movement about axes located on, or to the rear of, a transverse line through the center of gravity of the airplane and upstanding from said surfaces, said fins being of substantially symmetrical airfoil shape whereby negligible induced drag forces are produced thereby when aligned with the relative wind, and means for producing a large restoring moment about the center of gravity of the airplane during yawed flight of the latter whereby aerodynamic lift forces are produced by said fin to return the airplane to its normal flight position, including means for positively arresting the outboard movement of a fin the trailing portion of which tends to move outboard upon a yawed deflection of the airplane, said arresting means limiting said fin against outboard movement beyond a position parallel to the longitudinal axis of the airplane.

QUENTIN WALD.

REFERENCES CITED

The following references are of record in the file of this patent:

UNITED STATES PATENTS

| Number | Name | Date |
|---|---|---|
| 1,825,609 | Wald | Sept. 29, 1931 |
| 2,390,939 | Huff | Dec. 11, 1945 |

FOREIGN PATENTS

| Number | Country | Date |
|---|---|---|
| 324,075 | Germany | Aug. 24, 1922 |
| 23,645 | Great Britain | July 6, 1910 |